(12) United States Patent
Schultz et al.

(10) Patent No.: US 7,651,226 B2
(45) Date of Patent: Jan. 26, 2010

(54) LIGHT MASKING FOR A SEGMENTED DISPLAY SYSTEM

(75) Inventors: Mark Alan Schultz, Carmel, IN (US); Matthew Robert Lamb, Westfield, IN (US); Charles Bryan Hunt, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 39 days.

(21) Appl. No.: 10/583,612

(22) PCT Filed: Dec. 22, 2004

(86) PCT No.: PCT/US2004/043690

§ 371 (c)(1),
(2), (4) Date: Jun. 20, 2006

(87) PCT Pub. No.: WO2005/064933

PCT Pub. Date: Jul. 14, 2005

(65) Prior Publication Data

US 2007/0103653 A1    May 10, 2007

Related U.S. Application Data

(60) Provisional application No. 60/531,732, filed on Dec. 22, 2003.

(51) Int. Cl.
- *G03B 21/26* (2006.01)
- *G03B 21/22* (2006.01)
- *G03B 21/28* (2006.01)
- *H04N 5/64* (2006.01)
- *G09G 5/00* (2006.01)

(52) U.S. Cl. .............. 353/94; 353/75; 353/78; 353/97; 353/99; 348/744; 345/1.3

(58) Field of Classification Search ............ 353/94, 353/29, 30, 37, 75, 77, 78, 88, 89, 91, 97–99, 353/119, 122; 348/739, 744; 349/5, 7, 8; 345/1.1, 1.2, 1.3, 3.1

See application file for complete search history.

(56) References Cited

U.S. PATENT DOCUMENTS

| | | | | |
|---|---|---|---|---|
| 5,457,508 A | * | 10/1995 | Ichihara et al. | 353/10 |
| 5,537,166 A | * | 7/1996 | Keelan et al. | 353/97 |
| 5,897,192 A | * | 4/1999 | Seufert | 353/74 |
| 6,540,363 B1 | | 4/2003 | Steffensmeier | |

(Continued)

FOREIGN PATENT DOCUMENTS

CA    2227920    7/1999

(Continued)

OTHER PUBLICATIONS

Search Report dated Apr. 22, 2005.

*Primary Examiner*—Rochelle-Ann J Blackman
(74) *Attorney, Agent, or Firm*—Robert D. Shedd; Harvey D. Fried; Patricia Verlangieri

(57) ABSTRACT

A segmented display system in which the display devices are arranged in a N×1 array is described. The segmented display system includes a plurality of projection devices that each project a portion of an image on a corresponding one of the display devices in the N×1 array. Distortion from extra light is minimized using a moveable mask around each projection device lens in the N×1 array.

7 Claims, 3 Drawing Sheets

U.S. PATENT DOCUMENTS

| | | | |
|---|---|---|---|
| 6,637,887 B2 * | 10/2003 | Yamanaka | 353/30 |
| 6,727,864 B1 * | 4/2004 | Johnson et al. | 345/1.3 |
| 6,781,563 B2 * | 8/2004 | Nishio et al. | 345/1.1 |
| 2001/0022651 A1 * | 9/2001 | Kubota et al. | 353/94 |
| 2003/0058416 A1 * | 3/2003 | Safran et al. | 353/94 |
| 2003/0151727 A1 * | 8/2003 | Glent-Madsen et al. | 353/94 |

FOREIGN PATENT DOCUMENTS

| | | |
|---|---|---|
| EP | 1134610 | 7/2001 |
| FR | 2774481 | 2/1998 |
| WO | WO/03/056389 | 10/2003 |

* cited by examiner

LIGHT MASKING FOR A SEGMENTED DISPLAY SYSTEM

CROSS-REFERENCE TO RELATED APPLICATIONS

This application claims the benefit, under 35 U.S.C. § 365 of International Application PCT/US2004/043699, filed Dec. 22, 2004, which was published in accordance with PCT Article 21(2) on Jul. 14, 2005 in English and which claims the benefit of U.S. provisional patent application No. 60/531,732 filed Dec. 22, 2003.

FIELD OF THE INVENTION

The present invention generally relates to the field of displays, and more particularly to segmented display systems including multiple projection devices.

BACKGROUND OF THE INVENTION

Segmented display systems generally employ multiple projection devices and multiple display devices. Each projection device projects a portion of an image on a corresponding one of the display devices. For many segmented display systems, the display devices are arranged in a square array (N×N), such as, for example, a 2×2 array, as shown in FIG. 1.

In many segmented display systems, each projection device provides extra light that may undesirably distort projected images. Some segmented display systems use a cloth mask next to the lamp to block the extra light. However, the lamps used are 100 watt lamps that create a fire hazard when in proximity to the cloth mask.

Thus, there is a need for a segmented display system which minimizes distortion from extra light of the displayed images.

SUMMARY OF THE INVENTION

The present invention is directed to a segmented display system in which the display devices are arranged in a N×1 array. The segmented display system includes a plurality of projection devices that each project a portion of an image on a corresponding one of the display devices in the N×1 array. Distortion from extra light is minimized using a moveable mask around each projection device lens in the N×1 array.

BRIEF DESCRIPTION OF THE DRAWINGS

The invention is hereinafter described in detail with reference to the accompanying drawings, in which.

DETAILED DESCRIPTION

Figure 1:
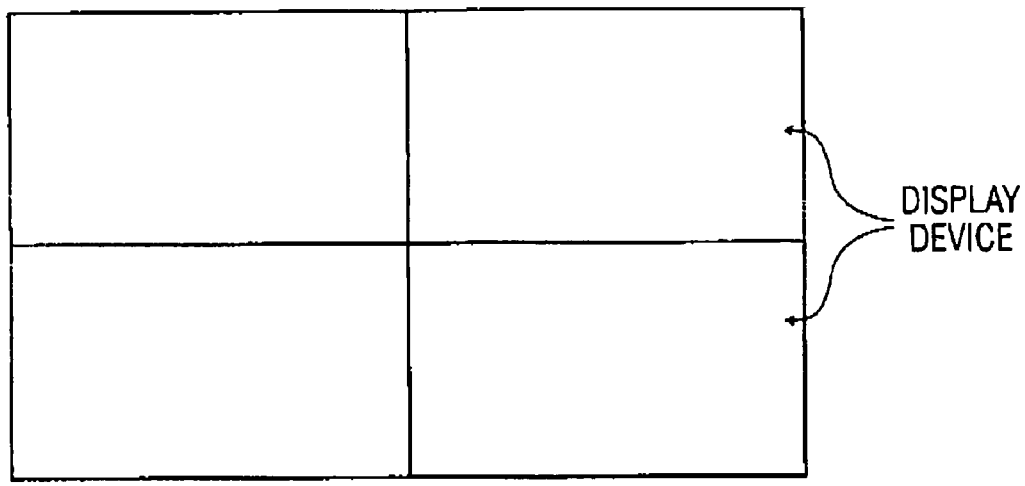
FIG. 1 depicts a segmented display system in which display devices are arranged in a 2×2 array.
Figure 2:
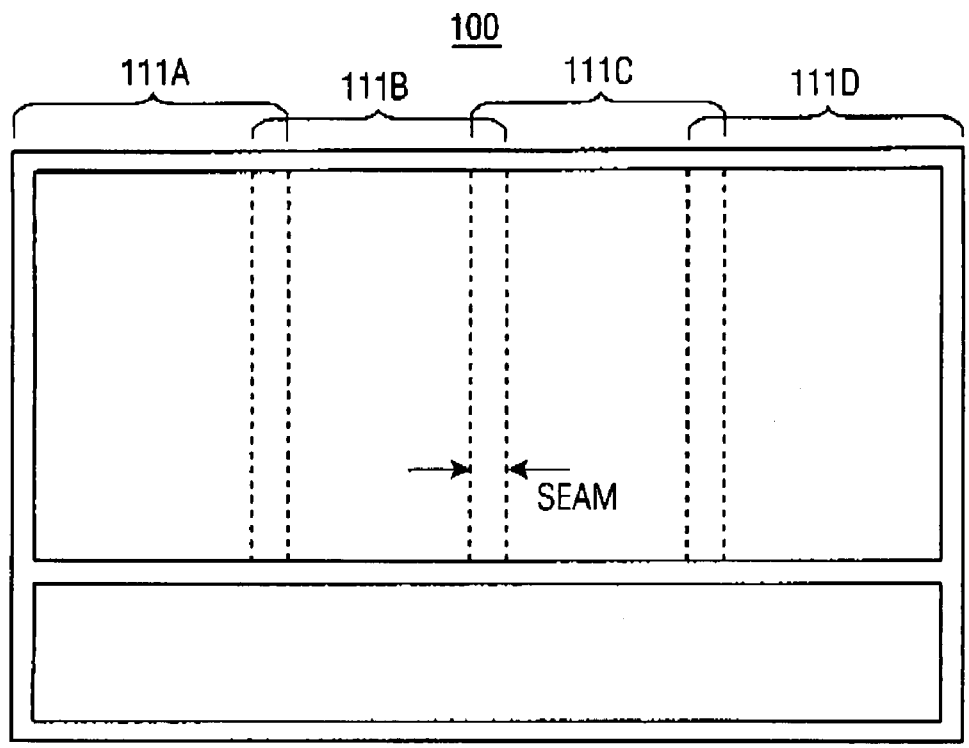
FIG. 2 depicts a front view of a segmented display system of the present invention in which display devices are arranged in a N×1 array.
Figure 3:
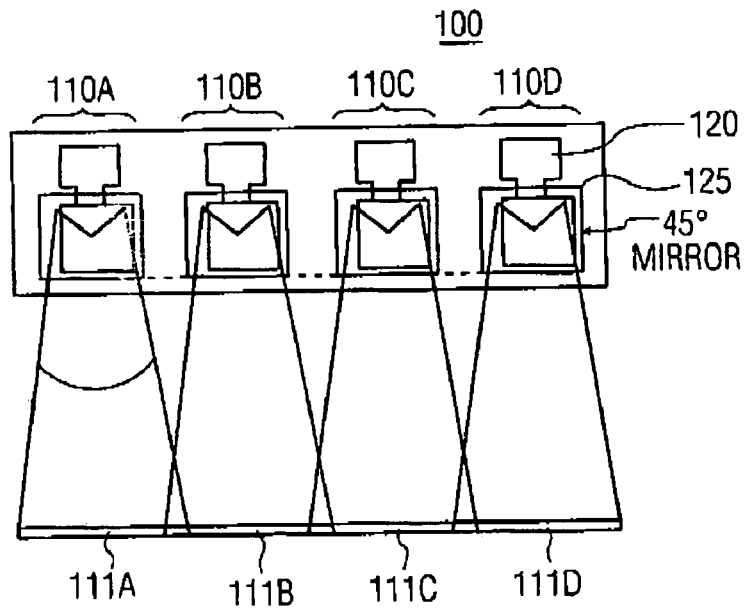
FIG. 3 depicts a top view of the segmented display system shown in FIG. 2 in which display devices are arranged in the N×1 array.

The present invention is directed to a segmented display system in which the display devices are arranged in a N×1 array. Referring the FIGS. 2-4, the segmented display system 100 includes a plurality of projection devices 110A, 110B, 110C, 110D that each project a portion of an image on a corresponding one of the display devices 111A, 111B, 111C, 111D in the N×1 array.

Figure 4:
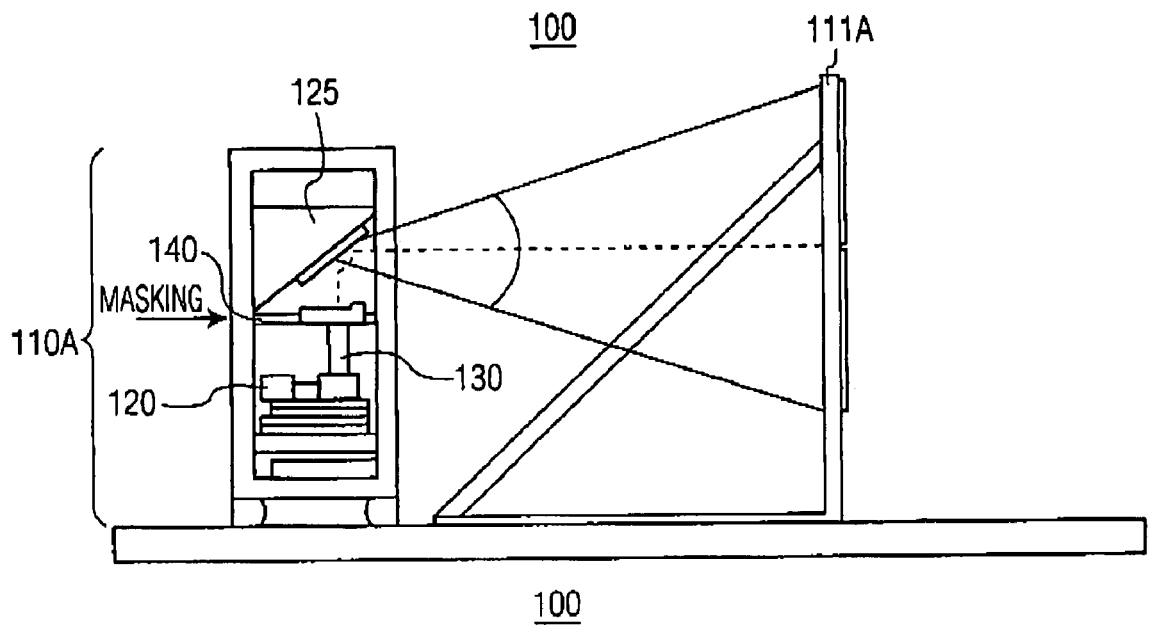
FIG. 4 depicts a side view of the segmented display system shown in FIG. 2 in which display devices are arranged in the N×1 array including a moveable mask on the lens of the projection device.

Referring to FIG. 4, each projection device 110A, 110B, 110C, 110D includes a lamp 120, a mirror 125, a lens mounting 130 and a moveable mask 140. The lamp 120 of each projector projects that portion of the image to be projected onto the mirror 125 and than to the corresponding one of the display devices 111A, 111B, 111C, 111D in the N×1 array.

The mirror 125 is placed at an angle of about 45 degrees relative to the lamp 120 and the display devices 111A, 111B, 111C, 111D. Using a mirror at about 45 degrees with respect to the lamp 120 maintains bulb lifetime due to thermal heating in the lamp 120.

Figure 5A:
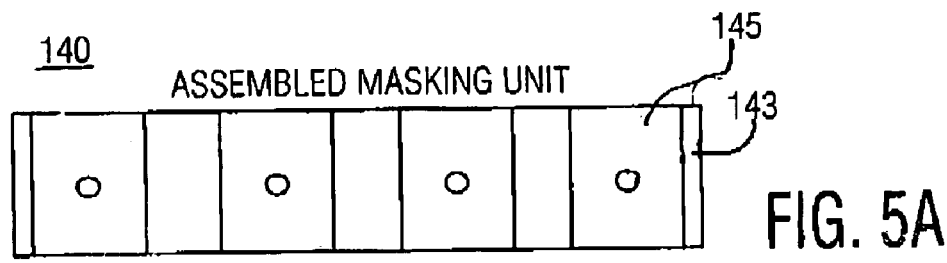
FIGS. 5A-B depict assembled top and side views of the moveable mask of FIG. 4.
Figure 5B:
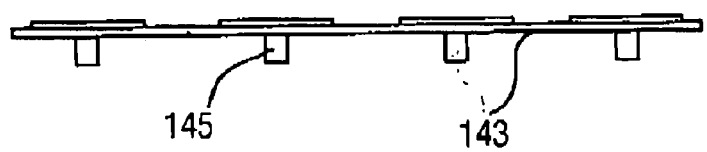
Figure 6A:
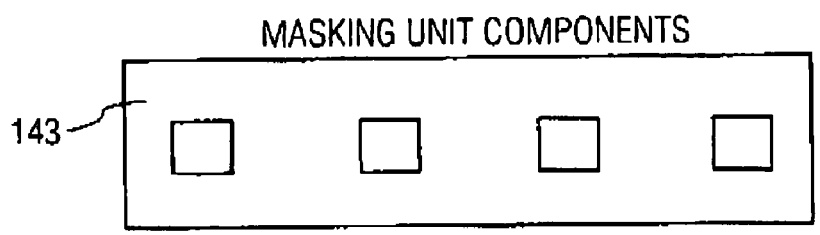
FIGS. 6A-E depict top, side and bottom views of a mask frame and mask of the moveable mask shown in FIGS. 5A-B.
Figure 6B:
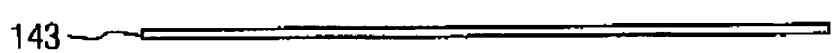
Figure 6C:
Figure 6D:
Figure 6E:
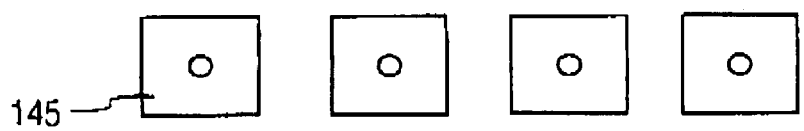

FIGS. 5A-B depict top and side views, respectively, of the moveable mask on the lens of each projection device. For the 4×1 array an assembled mask includes a mask frame 143 into which a mask 145 for each lens 130 is provided. Individual masks and frames for each lens may also be used. The mask frame 143 may be formed of a light absorbing material. The mask 145 is fitted around the lens 130 and is moveable on the mask frame 143. The mask 145 is moveable on the mask frame 143 so that each projection device 110A-D may be individually aligned to its respective display device 111A-111D of the segmented display system. FIGS. 6A-6E depict top, side and bottom views of a mask frame 143 and mask 145 of the moveable mask 140 shown in FIGS. 5A-B.

What is claimed is:

1. A projection system, comprising:
    a plurality of displays arranged adjacent to each other to form a screen;
    a plurality of projectors, one corresponding to each display of the plurality of displays, wherein each projector includes a lens;
    a mask assembly disposed between and surrounding each lens of the plurality of projectors and the corresponding plurality of displays.

2. The projection system of claim 1 wherein the plurality of displays are arranged in an N×1 array.

3. The projection system of claim 1 wherein each of the plurality of projectors further includes a mirror.

4. The projection system of claim 3 wherein the mirror is aligned at an angle of about 45 degrees with respect to a lamp of the projector.

5. The projection system of claim 1 wherein the mask assembly includes a mask frame and a mask.

6. The projection system of claim 5 wherein the mask is moveable relative to the mask frame.

7. The projection system of claim 5 wherein the mask is disposed on the lens.

* * * * *

UNITED STATES PATENT AND TRADEMARK OFFICE
CERTIFICATE OF CORRECTION

PATENT NO. : 7,651,226 B2  Page 1 of 1
APPLICATION NO. : 10/583612
DATED : January 26, 2010
INVENTOR(S) : Schultz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-third Day of November, 2010

David J. Kappos
*Director of the United States Patent and Trademark Office*